United States Patent
Dmitriev et al.

(10) Patent No.: US 10,036,933 B2
(45) Date of Patent: Jul. 31, 2018

(54) MULTIFUNCTIONAL OPTICAL DEVICE BASED ON A TWO-DIMENSIONAL PHOTONIC CRYSTAL AND MAGNETOOPTIC RESONATOR

(71) Applicant: UNIVERSIDADE FEDERAL DO PARA—UFPA, Belem-Para (BR)

(72) Inventors: Victor Dmitriev, Belem-Para (BR); Gianni Masaki Tanaka Portela, Belem-Para (BR)

(73) Assignee: UNIVERSIDADE FEDERAL DO PARA-UFPA (BR)

( * ) Notice: Subject to any disclaimer, the term of this patent is extended or adjusted under 35 U.S.C. 154(b) by 0 days.

(21) Appl. No.: 15/517,490

(22) PCT Filed: Oct. 6, 2015

(86) PCT No.: PCT/BR2015/050171
§ 371 (c)(1),
(2) Date: Apr. 6, 2017

(87) PCT Pub. No.: WO2016/054712
PCT Pub. Date: Apr. 14, 2016

(65) Prior Publication Data
US 2017/0219910 A1    Aug. 3, 2017

(30) Foreign Application Priority Data
Oct. 6, 2014 (BR) .......................... 102014025075

(51) Int. Cl.
*G02F 1/313*  (2006.01)
*G02B 6/122*  (2006.01)
(Continued)

(52) U.S. Cl.
CPC ........... *G02F 1/313* (2013.01); *G02B 6/1225* (2013.01); *G02F 1/0955* (2013.01); *G02F 1/295* (2013.01); *G02F 2202/32* (2013.01)

(58) Field of Classification Search
None
See application file for complete search history.

(56) References Cited

U.S. PATENT DOCUMENTS 6,937,781 B2    8/2005    Shirane et al. .......... G02B 6/26
7,133,588 B2    11/2006    Romagnoli et al. ..... G02B 6/26
(Continued)

FOREIGN PATENT DOCUMENTS

CN    101561531    10/2009    ............. G02B 6/122

OTHER PUBLICATIONS

Victor Dmitriev et al. 'Optical component: nonreciprocal three-way divider based on magneto-optical resonator'. Applied Optics, 2013 vol. 52, Issue 27, pp. 6657-6662 (6 Pages).
(Continued)

*Primary Examiner* — Tina Wong
(74) *Attorney, Agent, or Firm* — Hayes Soloway P.C.

(57) ABSTRACT

A two-dimensional photonic crystal in which are inserted four waveguides and a resonant cavity. Owing to the existence of the photonic band gap, an electromagnetic signal propagating through the device is confined within the guides and the cavity and, through the adjustment of the orientation of a dipole mode generated within the cavity, is able to function in three distinct regimes. In regime 1, subjected to an external DC magnetic field +H0, it functions as a two-way divider, with isolation of the input relative to the two outputs, and, upon reversal of the field signal, it functions as an optical key. In regime 2, with the use of a DC magnetic field −H0, it functions as a waveguide bender, with the input isolated from the output, and, upon reversal of the field
(Continued)

Figure 3:
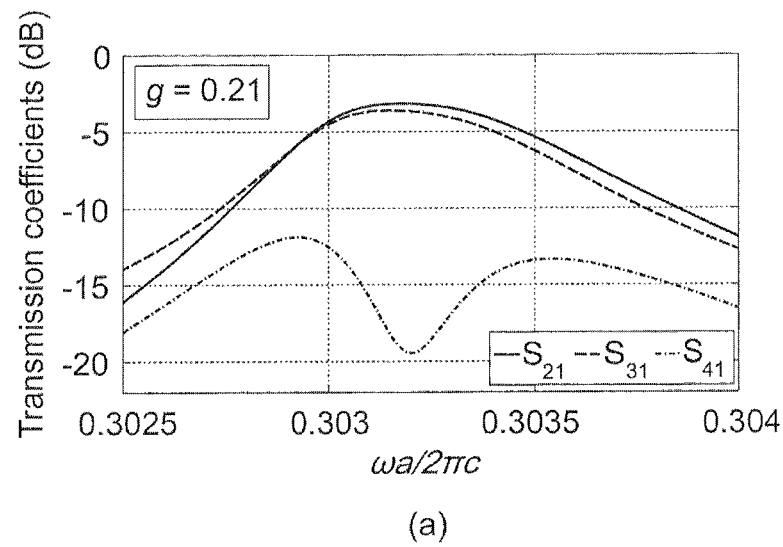
Figure 3:
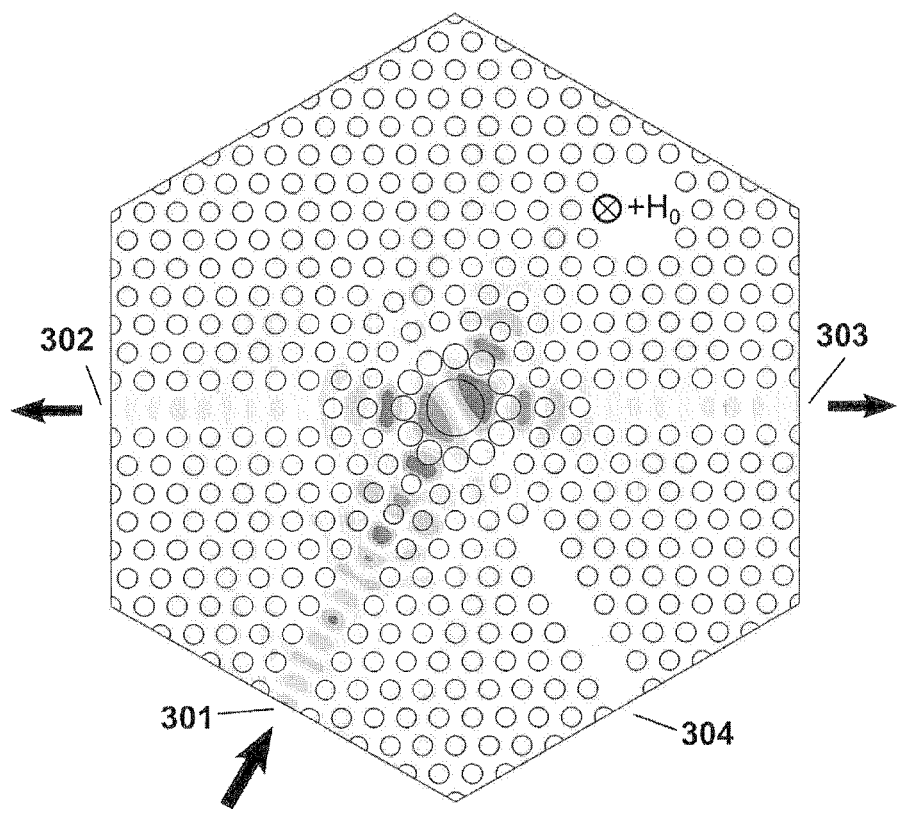

signal, functions as an optical key. In regime 3, subject to the application of an external DC magnetic field +H1, the device functions as a three-way divider.

15 Claims, 9 Drawing Sheets

(51) Int. Cl.
*G02F 1/095* (2006.01)
*G02F 1/295* (2006.01)

(56) References Cited

U.S. PATENT DOCUMENTS

| | | | | |
|---|---|---|---|---|
| 7,428,352 B2* | 9/2008 | Noda | ............ | B82Y 20/00 385/131 |
| 7,447,411 B2* | 11/2008 | Suzuki | ............ | B82Y 20/00 385/129 |
| 7,466,881 B1* | 12/2008 | Fattal | ............ | B82Y 20/00 359/346 |
| 7,489,846 B2* | 2/2009 | Grot | ............ | G02B 6/1225 385/123 |
| 8,693,923 B2* | 4/2014 | Iida | ............ | G03G 15/0893 399/119 |
| 8,731,360 B2* | 5/2014 | Ouyang | ............ | B82Y 20/00 359/321 |
| 9,778,496 B2* | 10/2017 | Dmitriev | ............ | G02F 1/095 |
| 9,778,540 B2* | 10/2017 | Dmitriev | ............ | G02F 1/3132 |
| 2005/0226561 A1 | 10/2005 | Romagnoli et al. | ...... | G02B 6/26 |
| 2005/0249455 A1 | 11/2005 | Shirane et al. | ...... | G02B 6/26 |
| 2006/0140539 A1 | 6/2006 | Lee et al. | ...... | G02B 6/26 |
| 2012/0243844 A1* | 9/2012 | Ouyang | ............ | B82Y 20/00 385/130 |
| 2013/0223805 A1 | 8/2013 | Ouyang et al. | ...... | G02B 6/10 |
| 2017/0123288 A1* | 5/2017 | Dmitriev | ............ | G02F 1/3133 |
| 2017/0322433 A1* | 11/2017 | Ouyang | ............ | G02F 1/0955 |

OTHER PUBLICATIONS

Ali Esmaieli et al 'Magneto-optical photonic crystal 1×3 switchable power divider'. Photonics and Nanostructures—Fundamentals and Applications, 2012 vol. 10, Issue 1, pp. 131-139 (9 Pages).

International Preliminary Report on Patentability Issued in Corresponding PCT/BR2015/050171 dated Apr. 11, 2017, with English Translation (5 Pages).

International Search Report and Written Opinion Issued in Corresponding PCT/BR2015/050171 dated Jan. 28, 2016, with English Translation (11 Pages).

* cited by examiner

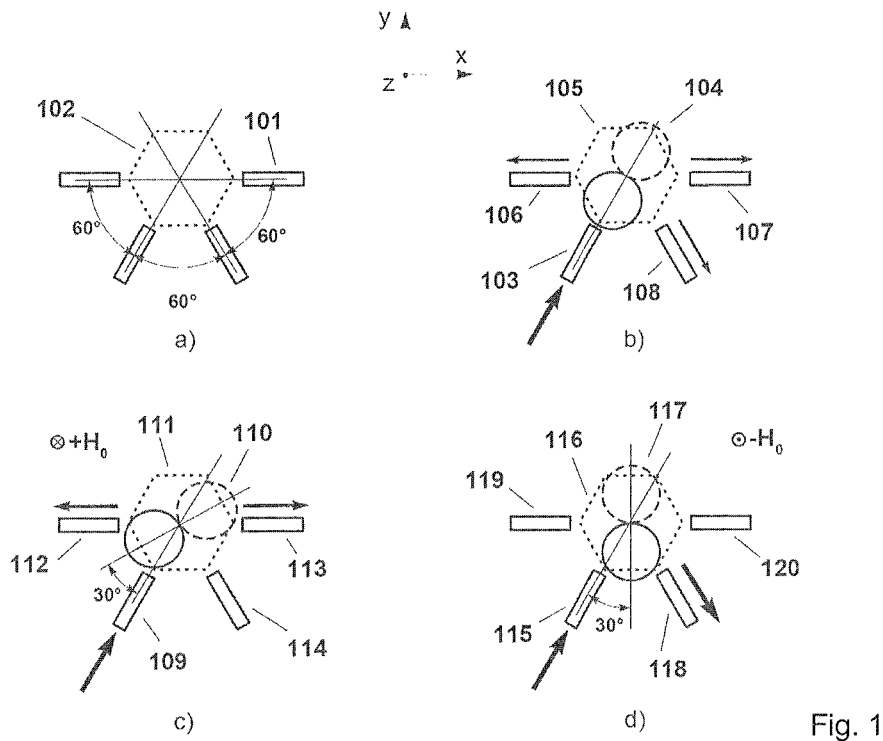
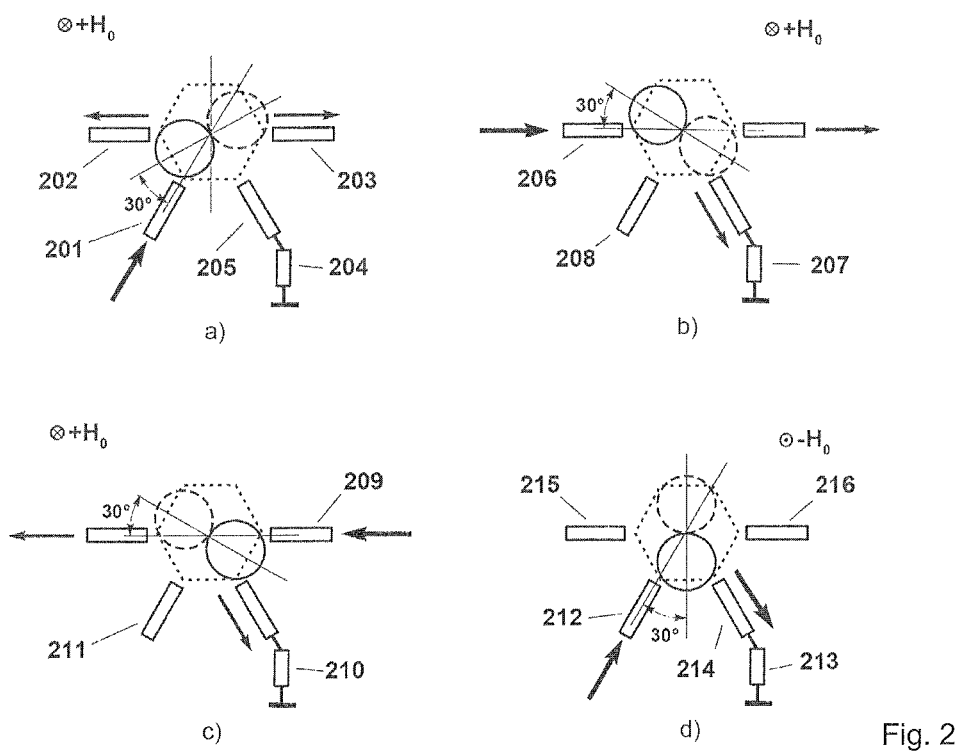
Fig. 1
Fig. 2

(a)

(b)

(a)

(b)

(a)

(b)

(a)

(b)

(a)

(b)

MULTIFUNCTIONAL OPTICAL DEVICE BASED ON A TWO-DIMENSIONAL PHOTONIC CRYSTAL AND MAGNETOOPTIC RESONATOR

The present invention relates to a multifunctional optical device based on a two-dimensional photonic crystal and on a magneto-optical resonator. It can perform, in integrated optical systems, the following functions: signal switching; power division; waveguide bending; isolation.

Considering the current technological context, in which more and more devices with reduced dimensions are required, the development of the photonic crystal technology is highlighted. Devices based on this technology can be designed with reduced dimensions, being adequate for utilization in optical systems with high integration density.

In a simplified way, photonic crystals are structures in which the electric permittivity or magnetic permeability of the constituent materials are periodically modulated. This periodicity is related to the existence of a forbidden frequency band that characterizes these structures, known as photonic band gap.

Electromagnetic waves with frequency located inside the photonic band gap cannot propagate along the periodic structure of the photonic crystal. The operating principle of most of the photonic crystal based devices is related to the existence of this frequency band and to the insertion of defects in the crystalline structure that allow the propagation of electromagnetic waves.

The signal switching, power division, waveguide bending, and isolation functions are required to the functioning of most of the optical systems. Optical switches permit the control of the flow of an electromagnetic signal inside a communication channel, allowing or blocking its passage. Power dividers split the power of an input electromagnetic signal between two or more outputs. Waveguide bending elements are used when a change on the propagation direction of an electromagnetic signal is desired. Isolators are usually employed on the protection of signal sources against parasitic reflections arising from non-ideally matched loads. The present invention is capable of performing the functions of all the devices mentioned above.

Several patents related to the individual devices (switches, dividers, bending elements, and isolators) have been deposited, among which the following are highlighted.

The patent US2005249455 describes an optical switch based on a two-dimensional photonic crystal with triangular lattice. The refractive index of the constituent materials can be modified according to the application of an optical control signal. Depending on the intensity of the control signal, the switch may either allow (on state) or block (off state) the propagation of an electromagnetic signal along a communication channel.

On the other hand, the device presented in the patent CN101561531 is an optical power divider based on a two-dimensional photonic crystal with square lattice. Two linear defects inserted inside the crystal cross each other (resembling the T-shape) and, at the intersection region, a cavity is created through the insertion of a dielectric cylinder. The power of the input signal is equally divided between the two output ports.

A waveguide bending element is described in the patent US2005226561. This bending element is based on a two-dimensional photonic crystal with triangular lattice and on a reflective surface. It is inserted between two waveguides which form a 90 degrees angle. An incident signal is transmitted from one waveguide to the other one, with the change on the propagation direction being performed inside the bending element.

Also worth mentioning is the optical isolator described in patent US2006140539. It is based on a two-dimensional photonic crystal with triangular lattice and on the insertion of defects inside the crystalline structure, so that signals can propagate only from input to output. The propagation of signals in the opposite direction (from output to input), associated to the parasitic reflection arising from non-ideally matched loads, is blocked by the isolator.

The devices that usually make up integrated optical systems perform only one of the previous functions, being necessary the connection between them, so that the system can operates. The present invention can integrate, in a single device with reduced dimensions, all the mentioned functions, allowing the increase on the components integration density in optical circuits.

The utilization of this device in integrated optical systems also contributes to the reduction of losses in these systems. The sum of the losses of every single component (switches, dividers, etc.) and of all the interconnecting lines may compromise the functioning of the system. Through the utilization of the proposed device, the losses are reduced to the losses of a single component, as well as the number of interconnecting lines is reduced.

The properties of the magneto-optical material in which this invention is based depends on the intensity of an external DC magnetic field. In this case, the magnetization is uniform and an electromagnet can be used in the magnetization circuit of the structure. The intensity of the magnetic field generated by the electromagnet is proportional to the intensity of the electric current that flows through it.

It can be used in three different regimes and it operates, in all regimes, with low insertion losses, high isolation between input and output(s), and high operating bandwidth, as well as almost equal division levels between the output ports, considering the operation as a power divider.

In general, the device consists of a two-dimensional photonic crystal based on a triangular lattice of holes etched in a magneto-optical material. It has four waveguides connected to a resonant cavity located in its center. The waveguides and the cavity are based on the insertion of defects inside the crystalline structure, which can be of two types, namely:

Linear defects: correspond to the removal of holes in a straight line and originate the waveguides;

Local defects: correspond to the modification of radius and position of some holes located in the center of the device, originating the resonant cavity.

Specifically, the device presents the following characteristics:

The lattice constant (a) of the photonic crystal in which the device is based depends on the operating wavelength range of the device. For operation in optical communication range, in which $\lambda$ is usually equal to 1.55 micrometers, a is equal to 480 nanometers;

The radius of the holes etched in the magneto-optical material and filled with air is equal to 0.3a;

The four waveguides that make up the device are inserted through the creation of four linear defects;

The resonant cavity that constitutes the device is inserted by means of the creation of several local defects in the center of the structure;

The device can operate in three regimes, hereinafter called regime 1, regime 2, and regime 3;

In regime 1, the device operates as a two-way divider. In this case, the applied DC magnetic field is +$H_0$ and the division of the power of an input signal between two output takes place, with protection of the input against parasitic reflection arising from two outputs. By inverting the sign of the DC magnetic field (+$H_0$ to –$H_0$), the device can be used as an optical switch;

In regime 2, the device performs the waveguide bending function. In this case, the value of the applied DC magnetic field is –$H_0$ and an electromagnetic signal that flows through the device has its propagation direction changed by an angle equal to 120 degrees. By inverting the sign of the DC magnetic field (–$H_0$ to +$H_0$), the device can be used as an optical switch;

In regime 3, the device operates as a three-way divider. The applied DC magnetic field is +$H_1$ and the power of an input electromagnetic signal is equally divided between three outputs;

The magneto-optical material in which the device is based is anisotropic. Its electric permittivity and magnetic permeability are described by the following expressions:

$$[\varepsilon] = \varepsilon_0 \begin{pmatrix} 6.25 & -ig & 0 \\ ig & 6.25 & 0 \\ 0 & 0 & 6.25 \end{pmatrix}; \mu = \mu_0$$

Where:
ε is the electric permittivity of material (in Farads per meter);
$\varepsilon_0$ is the electric permittivity of free space (in Farads per meter);
μ is the magnetic permeability of material (in Henrys per meter);
$\mu_0$ is the magnetic permeability of free space (in Henrys per meter);
i is the imaginary unit;
g is a parameter that depends on the characteristics of the magneto-optical material and on the intensity of the applied DC magnetic field.

In the following it will be presented the figures that illustrate the operating principle of the device, as well as a detailed description of the designed invention.

FIG. 1 shows, schematically, the designed device. FIG. 1a shows the four waveguides connected to the magneto-optical resonator and the angles formed by the waveguides. FIG. 1b presents the nonmagnetized device, while FIGS. 1c and 1d present the magnetized device.

FIG. 2 presents, in a schematic way, the device operating in regime 1. FIGS. 2a, 2b, and 2c show the device subjected to the application of a DC magnetic field +$H_0$ (on state), while FIG. 2d shows the device subjected to a DC magnetic field –$H_0$ (off state).

FIG. 3a shows the frequency response of the device operating in "on state" of regime 1 and in "off state" of regime 2. The transmission coefficients $S_{ij}$—whose indices i and j can be equal to 1, 2, 3, or 4—are the entries of the scattering matrix [S]. FIG. 3b shows a top view of the device operating in both cases, in which the four waveguides 301 to 304 and the resonant cavity of the device are shown, as well as the electromagnetic field component $H_z$ at the normalized central frequency $\omega a/2\pi c=0.30318$, where: ω is the angular frequency (in radians per second); a is the lattice constant (in meters); c is the speed of light in free space (approximately equal to 300,000,000 meters per second).

FIG. 4a shows the frequency response related to the parasitic reflections arising from port 402, considering operation in "on state" of regime 1. FIG. 4b shows a top view of the device when subjected to these reflections, in which are shown the four waveguides 401 to 404, the resonant cavity, and the electromagnetic field component $H_z$ associated with these reflections, at the normalized central frequency $\omega a/2\pi c=0.30318$.

FIG. 5a shows the frequency response related with parasitic reflections arising from port 503, considering operation in "on state" of regime 1. FIG. 5b shows a top view of the device when subjected to these reflections, in which are shown the four waveguides 501 to 504 and the resonant cavity of the device, as well as the electromagnetic field component $H_z$ associated with these reflections, at the normalized central frequency $\omega a/2\pi c=0.30318$.

FIG. 6a presents the frequency response of the device operating in "off state" of regime 1 and in "on state" of regime 2. FIG. 6b presents a top view of the device operating in both cases, in which are shown the four waveguides 601 to 604, the resonant cavity, and the electromagnetic field component $H_z$, at the normalized central frequency $\omega a/2\pi c=0.30318$.

Figure 7:
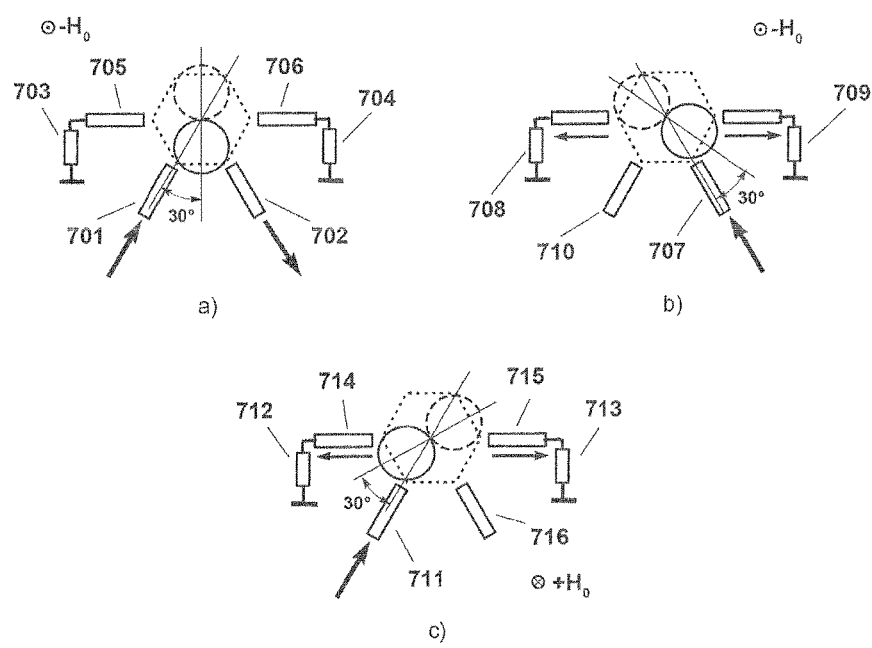

FIG. 7 presents, schematically, the device operating in regime 2. FIGS. 7a and 7b present the device under the application of a DC magnetic field –$H_0$ (on state), while FIG. 7c shows the device under the application of a DC magnetic field +$H_0$ (off state).

FIG. 8a shows the frequency response of the device related to the parasitic reflections that arise from port 804, considering operation in "on state" of regime 2. FIG. 8b presents a top view of the device when subjected to these reflections, in which are shown the four waveguides 801 to 804 and the resonant cavity of the device, as well as the electromagnetic field component $H_z$, at the normalized central frequency $\omega a/2\pi c=0.30318$.

Figure 9:
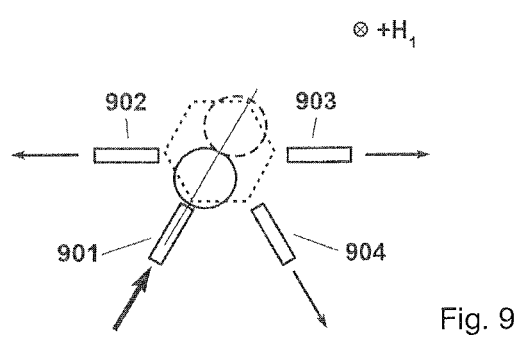

FIG. 9 presents, in a schematic way, the device operating in regime 3, subjected to the application of a DC magnetic field +$H_1$.

Figure 10:
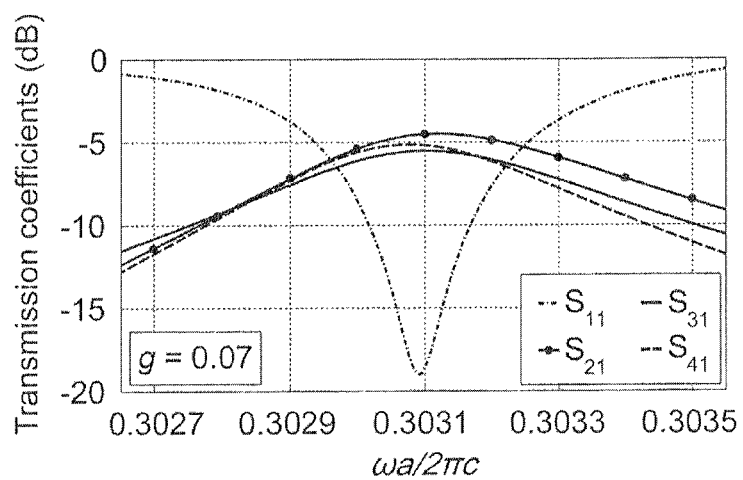
Figure 10:
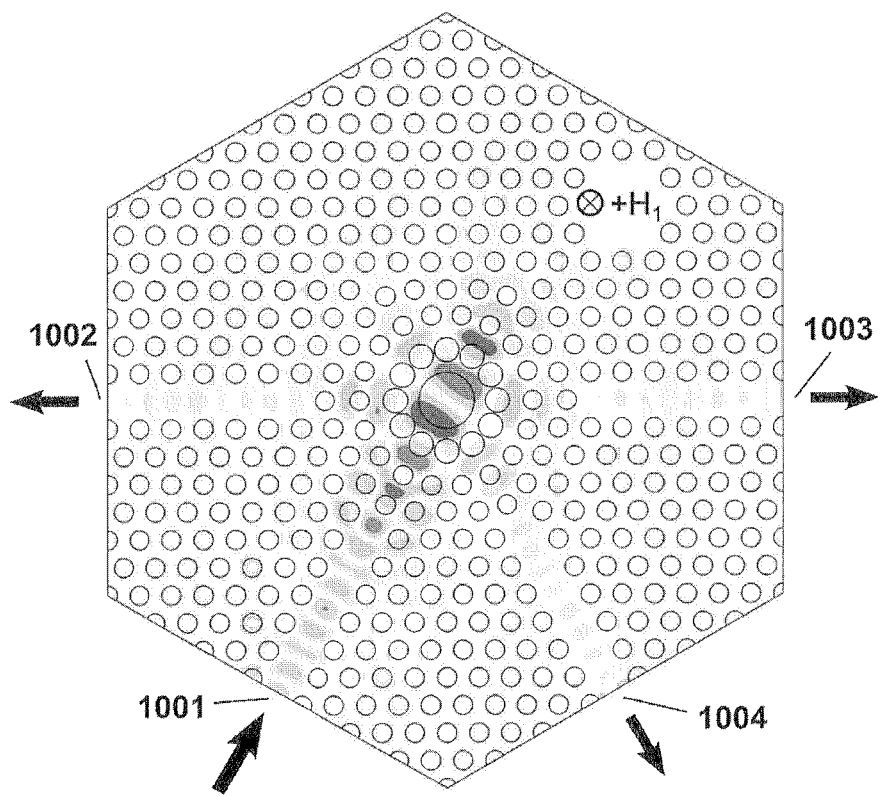

FIG. 10a presents the frequency response of the device operating in regime 3. FIG. 10b shows a top view of the four waveguides 1001 to 1004 and the resonant cavity of the device, as well as the electromagnetic field component $H_z$, at the normalized central frequency $\omega a/2\pi c=0.30309$.

The presented invention consists of four waveguides 101, separated by an angle equal to 60 degrees, and one resonant cavity 102 (FIG. 1a). When the structure is not subjected to the application of a DC magnetic field (FIG. 1b), the application of an electromagnetic signal to the input waveguide 103 promotes the excitation of a stationary dipole mode 104 in the resonant cavity 105, whose axis is aligned with the axis of the input waveguide. In this case, the device divides, theoretically, the input power between the three output waveguides 106, 107, and 108, and the parameter g is equal to 0.

When the device is subjected to the application of a DC magnetic field +$H_0$ (FIG. 1c), the application of an electromagnetic signal to the input waveguide promotes the excitation of a dipole mode 110 in the resonant cavity 111, whose orientation is changed by an angle of 30 degrees (clockwise direction), relatively to the dipole 104. In this case, the input power is equally divided between the waveguides 112 and 113, and the dipole nodes are aligned with the waveguide 114, so that no electromagnetic waves are excited in the latter waveguide. In this case, the parameter g equals 0.21.

On the other hand, when the device is subjected to the application of a DC magnetic field –$H_0$ (FIG. 1d), an electromagnetic signal that flows through the input waveguide 115 excites, in the resonant cavity 116, a dipole mode 117 rotated by an angle of 30 degrees (counterclockwise direction), relatively to the dipole 104. In this case, the input power is directed to the output waveguide 118, while the dipole nodes are aligned with waveguides 119 and 120, so that no electromagnetic waves are excited in the latter waveguides. In this case, the parameter g equals −0.21.

In regime 1, shown in FIG. 2, the device operates as a two-way divider in the "on state", with external DC magnetic field $+H_0$, and as a switch, by inverting the sign of the DC magnetic field ($+H_0$ to $-H_0$). In the "on state", an electromagnetic signal applied to the input waveguide 201 has its power equally divided between the output waveguides 202 and 203 (FIG. 2a). A matched load 204, connected to the waveguide 205, receives most of the parasitic reflections originated from non-ideally matched loads connected to output waveguides 202 and 203.

FIGS. 2b and 2c present the effects of the parasitic reflections, arising from non-ideally matched loads connected to the outputs, on a signal source connected to the input waveguide. In the case where the reflections arise from waveguide 206 (FIG. 2b), most of them are directed to the matched load 207, with no interferences on the functioning of the signal source connected to the input waveguide 208. The same is true for the case in which reflections arise from waveguide 209, which are directed to the matched load 210 and do not interfere on the functioning of the signal source connected to the waveguide 211. Therefore, the input is isolated from the outputs.

By inverting the sign of the DC magnetic field (FIG. 2d), the device starts to operate in the "off state" of regime 1. In this case, an electromagnetic signal applied to the input waveguide 212 is transferred to the matched load 213, connected to the waveguide 214. No electromagnetic waves are excited in output ports 215 and 216 and the device operates as a switch.

The performance characteristics of the device operating in the "on state" of regime 1 are shown in FIG. 3. The division levels between ports 302 and 303 are about −3.8 dB, while port 304, which is connected to a matched load, is isolated from the input 301 by −19 dB. The bandwidth, defined at the level −15 dB of the isolation curves, is equal to 178 GHz (considering the wavelength $\lambda=1.55$ μm). The variation on the division levels inside this band is (−3.7±0.7) dB.

Figure 4:
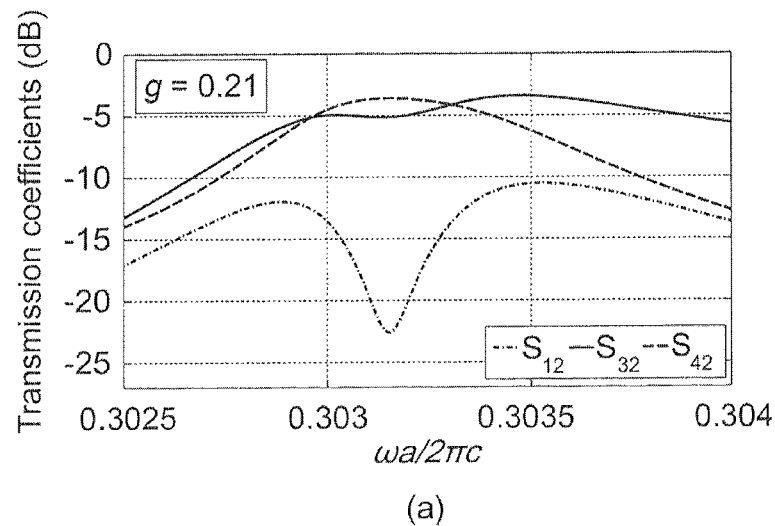
Figure 4:
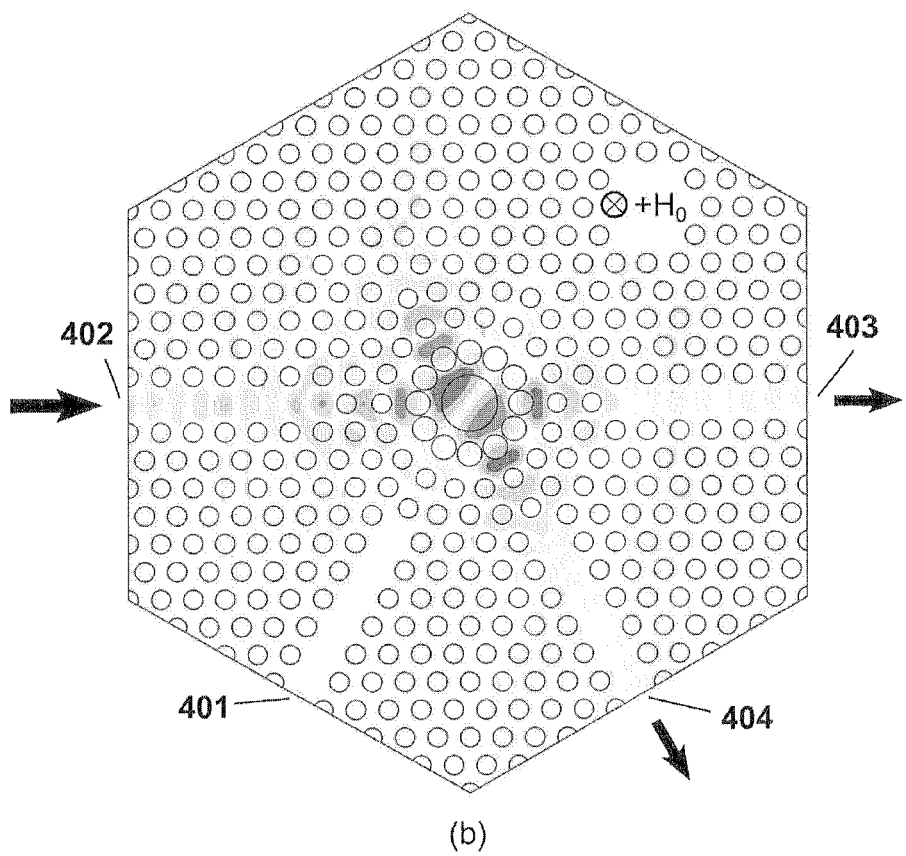
Figure 5:
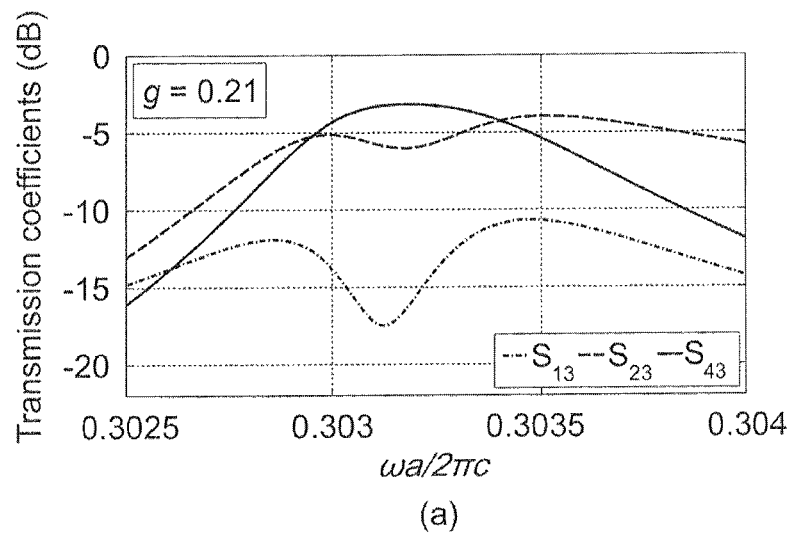
Figure 5:
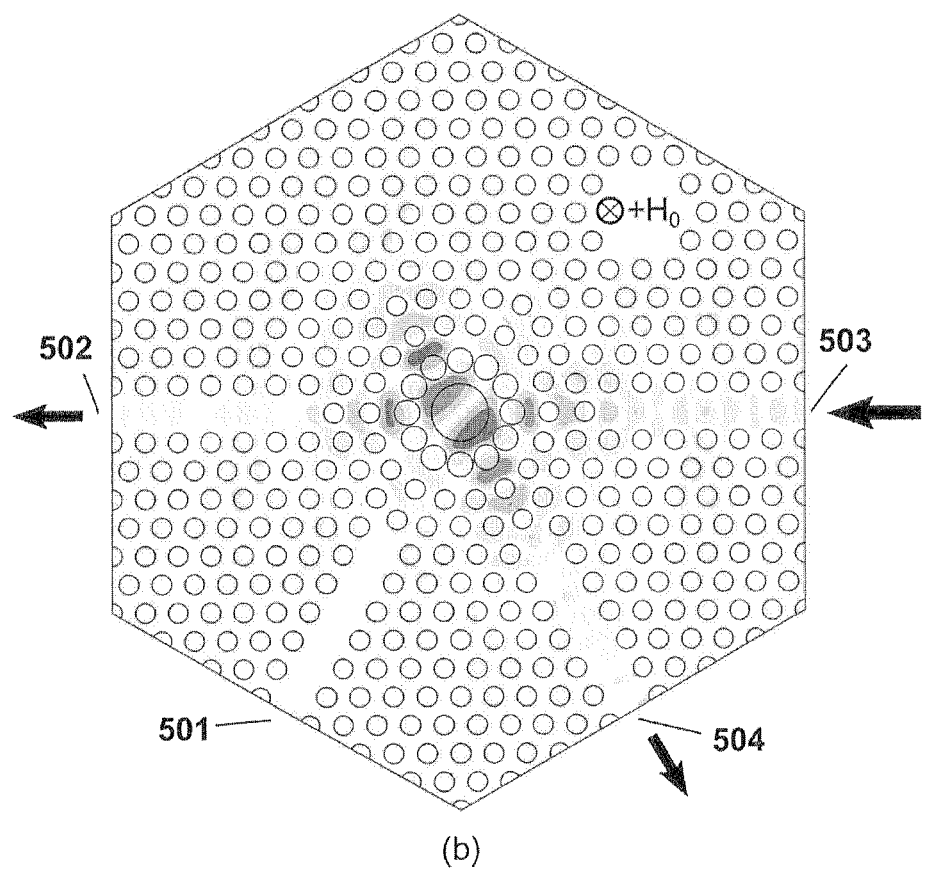

The effect of reflections on a signal source connected to the input, in this case, can be verified in FIG. 4 (FIG. 5). Reflections arising from port 402 (503) do not affect the signal source connect to port 401 (501), since they are directed to a matched load connected to port 404 (504) and to the other output port 403 (502).

Figure 6:
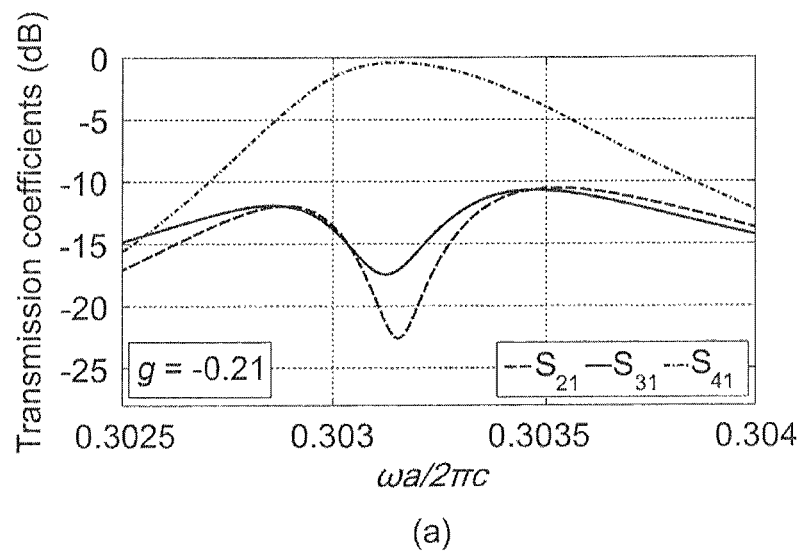
Figure 6:
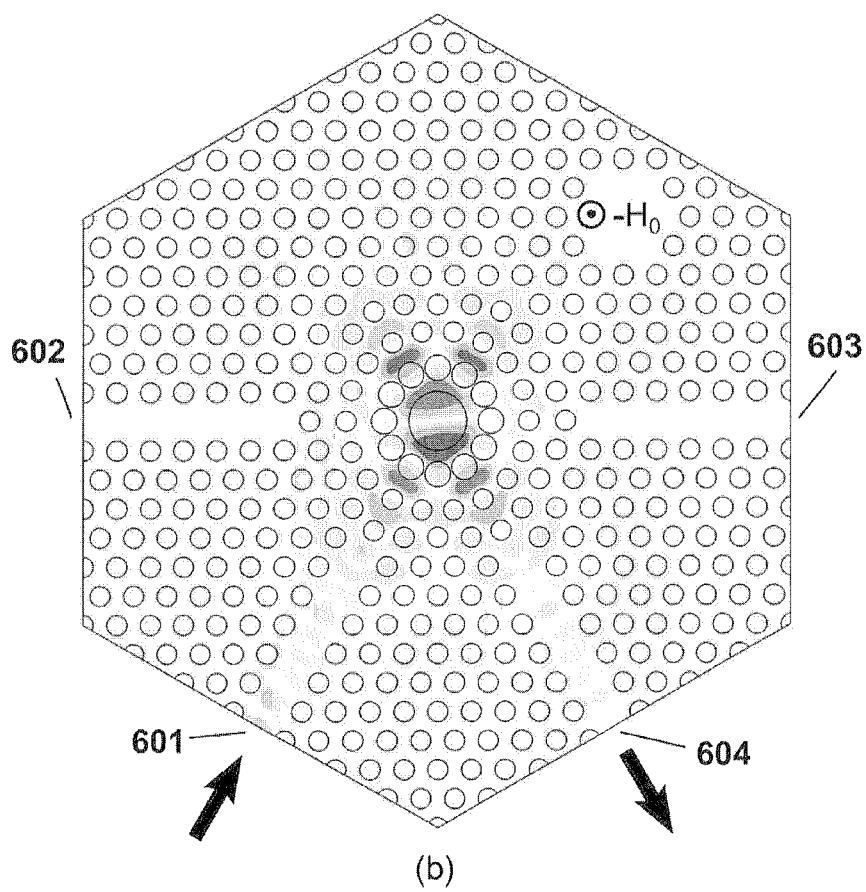

The performance characteristics of the "off state" of regime 1, in which the sign of the DC magnetic field is inverted, are shown in FIG. 6. It is possible to observe that most of the input power, coming from port 601, is coupled with the matched load connected to port 604. The outputs 602 and 603 are aligned with the dipole nodes and are not excited.

In regime 2, shown in FIG. 7, the device operates as a waveguide bending element in the "on state", with external DC magnetic field $-H_0$, and as a switch, by inverting the sign of the DC magnetic field ($-H_0$ to $+H_0$). In the "on state", an electromagnetic signal applied to the input waveguide 701 is transferred to the output waveguide 702, with a bending angle (change on the propagation direction) equal to 120 degrees (FIG. 7a). Matched loads 703 and 704, connected to the waveguides 705 and 706, respectively, receive most of the parasitic reflections arising from the output waveguide 702.

The effect of these reflections is represented in FIG. 7b, in which an electromagnetic signal coming from the output waveguide 707 (representing these reflections) is totally absorbed by the matched loads 708 and 709. Thus, the signal source connected to the input waveguide 710 is isolated from the output 707.

By inverting the sign of the external DC magnetic field ($-H_0$ to $+H_0$), the device starts to operate in the "off state" of regime 2. In this case, the device operates as a switch and an incident signal applied to the input waveguide 711 is transferred to two matched loads 712 and 713, connected to the waveguides 714 and 715, respectively. No electromagnetic signals are excited in the output waveguide 716.

The performance characteristics of the device operating in the "on state" of regime 2 are identical to those of the device operating in the "off state" of regime 1. The differences between the cases relate to the position and quantity of ideally matched loads connected to the device (see FIGS. 2d and 7a). The transmission level from input to output is −0.4 dB, while the transmission levels to the two ports connected with ideally matched loads are −21 dB and −17 dB. The bandwidth, defined at the level −15 dB of the isolation curves, is equal to 113 GHz (considering the wavelength $\lambda=1.55$ μm).

Figure 8:
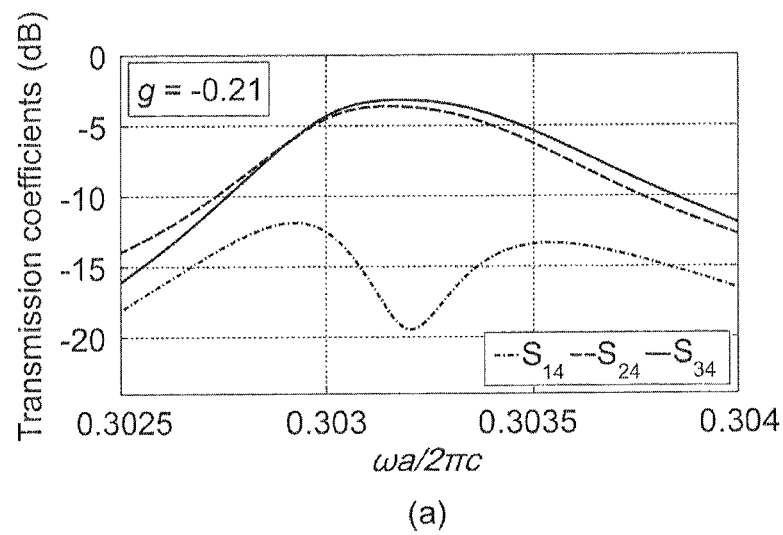
Figure 8:
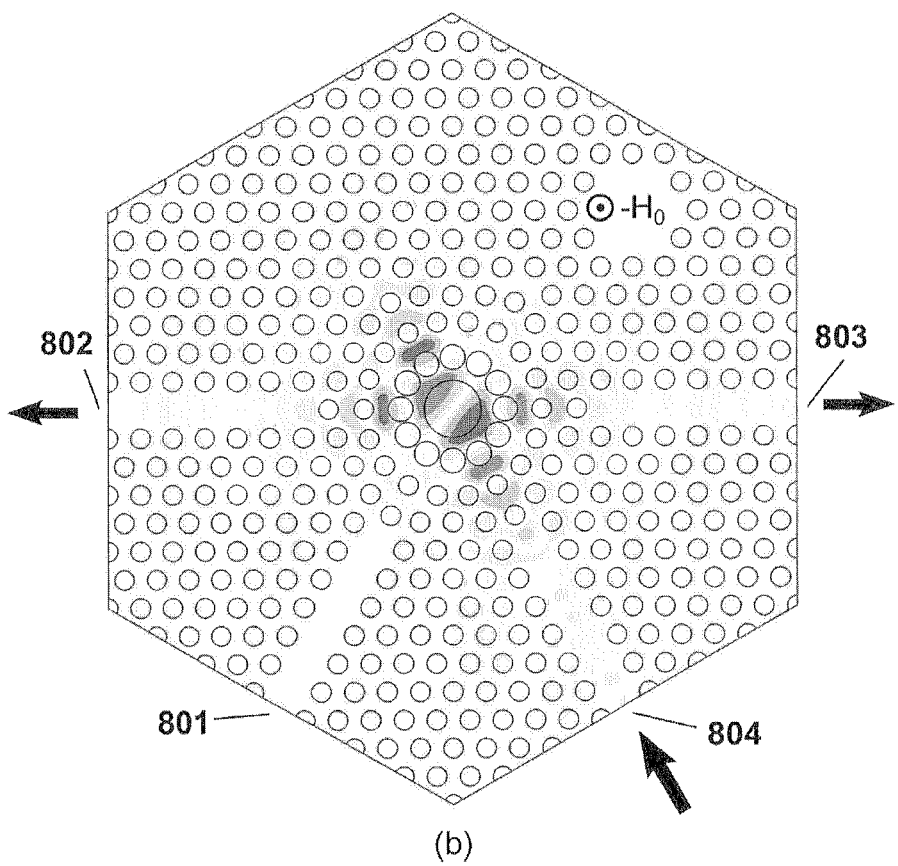

In FIG. 8, one can observe that parasitic reflections arising from output 804 are transmitted to two ideally matched loads connected to ports 802 and 803, so that the functioning of the signal source connected to the input port 801 is not compromised by them.

The operation of the device in the "off state" of regime 2 is similar to the operation in the "on state" of regime 1 (FIG. 3). Again, the only differences between both cases are the position and quantity of ideally matched loads connected to the device (see FIGS. 2a and 7c). One can observe that all the input power is transferred to two ideally matched loads and the output is isolated from the input.

In regime 3, the device operates as a three-way divider. An electromagnetic signal applied to the input waveguide 901 has its power equally divided between the output waveguides 902, 903, and 904. Preliminarily, the device would not need to be magnetized, in order to operate in this regime (see FIG. 1b). However, through the application of a small DC magnetic field $+H_1$, a fine adjustment on the division levels between the three output ports has been performed, in order to obtain equal division levels. In this case, parameter g equals 0.07.

The transmission coefficients of the device operating in this regime are shown in FIG. 10a. The division levels between the three output ports are about −5.2 dB. The bandwidth, defined at the level −6 dB of the power division curves, is 110 GHz (considering the wavelength $\lambda=1.55$ μm). The variation on the division levels in this band is (−5.2±0.7) dB. In FIG. 10b, one can see the electromagnetic field profile inside the device and the division of input power, coming from port 1001, between the outputs 1002, 1003, and 1004.

The invention claimed is:

1. A multifunctional optical device based on a two-dimensional photonic crystal and on a magneto-optical resonator, comprising:
   a two-dimensional photonic crystal comprising a triangular lattice of air holes in a magneto-optical material and having four waveguides inserted therein; and a resonant cavity formed by modifying a radius of each of a plurality of air holes in a center of the photonic crystal, wherein the device operates in three distinct regimes, and wherein the device performs signal switching, power division, waveguide bending, and isolation functions.

2. A multifunctional optical device based on a two-dimensional photonic crystal and on a magneto-optical resonator, comprising:
a two-dimensional photonic crystal comprising a triangular lattice of air holes in a magneto-optical material and having four waveguides inserted therein; and
a resonant cavity formed by modifying a radius of each of a plurality of air holes in a center of the photonic crystal, wherein by applying an external DC magnetic field $+H_0$ (on state), the device is a two-way divider, and by inverting a sign of the external DC magnetic field (off state), the device is an optical switch, and wherein, in an "on state", an input of the device is isolated from two outputs and the power division levels are −3.8 dB, while a bandwidth, defined at the level −15 dB, is equal to 178 GHz (considering the wavelength $\lambda=1.55$ μm).

3. A multifunctional optical device based on a two-dimensional photonic crystal and on a magneto-optical resonator, comprising:
a two-dimensional photonic crystal comprising a triangular lattice of air holes in a magneto-optical material and having four waveguides inserted therein; and
a resonant cavity formed by modifying a radius of each of a plurality of air holes in a center of the photonic crystal, wherein by applying an external DC magnetic field $-H_0$ (on state), the device is a waveguide bending element, and by inverting a sign of the external DC magnetic field (off state), the device is an optical switch, and wherein, in an "on state", an input of the device is isolated from an output and a transmission level from the input to the output is −0.4 dB, with a 120 degree change in the propagation direction, while a bandwidth, defined at the level −15 dB, is equal to 113 GHz (considering the wavelength $\lambda=1.55$ μm).

4. A multifunctional optical device based on a two-dimensional photonic crystal and on a magneto-optical resonator, comprising:
a two-dimensional photonic crystal comprising a triangular lattice of air holes in a magneto-optical material and having four waveguides inserted therein; and
a resonant cavity formed by modifying a radius of each of a plurality of air holes in a center of the photonic crystal, wherein by applying an external DC magnetic field $+H_1$, the device is a three-way divider having power division levels between three output ports equal to −5.2 dB, with a variation defined by the interval (−5.2±0.7) dB, and a bandwidth, defined at the level −6 dB of the transmission curves, equal to 110 GHz (considering the wavelength $\lambda=1.55$ μm).

5. The device of claim 1, wherein the first and second, second and third, and third and fourth waveguides are each separated by an angle of 60 degrees.

6. The device of claim 1, wherein a radius of the air holes is 0.3 times the lattice constant of the photonic crystal.

7. The device of claim 2, wherein the first and second, second and third, and third and fourth waveguides are each separated by an angle of 60 degrees.

8. The device of claim 2, wherein a radius of the air holes is 0.3 times the lattice constant of the photonic crystal.

9. The device of claim 2, wherein when the external DC magnetic field is applied, an orientation of a dipole mode within the resonant cavity changes by an angle of 30 degrees.

10. The device of claim 3, wherein the first and second, second and third, and third and fourth waveguides are each separated by an angle of 60 degrees.

11. The device of claim 3, wherein a radius of the air holes is 0.3 times the lattice constant of the photonic crystal.

12. The device of claim 3, wherein when the external DC magnetic field is applied, an orientation of a dipole mode within the resonant cavity changes by an angle of 30 degrees.

13. The device of claim 4, wherein the first and second, second and third, and third and fourth waveguides are each separated by an angle of 60 degrees.

14. The device of claim 4, wherein a radius of the air holes is 0.3 times the lattice constant of the photonic crystal.

15. The device of claim 4, wherein when the external DC magnetic field is applied, an orientation of a dipole mode within the resonant cavity changes by an angle of 30 degrees.

* * * * *